UNITED STATES PATENT OFFICE.

BROCK WOODRUFF, OF ALBERT LEA, MINNESOTA.

PROCESS OF TREATING IRON.

SPECIFICATION forming part of Letters Patent No. 286,104, dated October 2, 1883.

Application filed June 5, 1883. (No specimens.)

*To all whom it may concern:*

Be it known that I, BROCK WOODRUFF, of Albert Lea, in the county of Freeborn and State of Minnesota, have invented a new and Improved Process of Treating Iron, of which the following is a full, clear, and exact description.

By my improved process I produce a malleable iron of great hardness and toughness, having some of the characteristics of steel, and especially adapted for railroad-nails, journals, horseshoes, and for other purposes where a hard and tough iron is an advantage.

In carrying out my improved process ordinary wrought-iron is first heated to near a welding-heat, then rolled in sand, reheated to a somewhat higher temperature than before, again rolled in sand and again reheated to a welding-heat, when it is immediately immersed in water to which has been added common salt in the proportion of one gallon of salt to twelve or fifteen of water, more or less.

Iron made by this process can be heated, worked, welded, and otherwise manipulated without destruction of the properties imparted to it in the process named. The iron is very hard and tough, and is far superior to ordinary rolled iron for any ordinary purpose.

Having thus described my invention, what I claim as new, and desire to secure by Letters Patent, is—

The hereinbefore-described process of treating iron, which consists in repeated heating alternated with rolling in sand, and a final heating to about a welding-point, and immersion in water containing common salt in about the proportions specified.

BROCK WOODRUFF.

Witnesses:
W. A. HIGGINS,
C. O. BARNESS,